(12) United States Patent
Luo et al.

(10) Patent No.: US 10,894,524 B1
(45) Date of Patent: Jan. 19, 2021

(54) ALARM APPARATUS AND VEHICLE SAFETY SYSTEM FOR PREVENTING LEAVING CHILD IN VEHICLE

(71) Applicant: Zhengzheng Luo, Diamond Bar, CA (US)

(72) Inventors: Zhengzheng Luo, Diamond Bar, CA (US); Jueqing He, Diamond Bar, CA (US)

(73) Assignee: Zhengzheng Luo, Diamond Bar, CA (US)

( * ) Notice: Subject to any disclaimer, the term of this patent is extended or adjusted under 35 U.S.C. 154(b) by 0 days.

(21) Appl. No.: 16/558,346

(22) Filed: Sep. 3, 2019

(51) Int. Cl.
| | |
|---|---|
| B60R 22/48 | (2006.01) |
| B60R 21/015 | (2006.01) |
| B60W 40/08 | (2012.01) |
| G08B 21/24 | (2006.01) |
| B60W 50/14 | (2020.01) |
| B60R 21/01 | (2006.01) |

(52) U.S. Cl.
CPC ....... *B60R 21/01538* (2014.10); *B60W 40/08* (2013.01); *B60W 50/14* (2013.01); *G08B 21/24* (2013.01); *B60R 2021/0104* (2013.01)

(58) Field of Classification Search
CPC ........ B60R 21/01512; B60R 21/01534; B60R 21/01538; G08B 21/24
See application file for complete search history.

(56) References Cited

U.S. PATENT DOCUMENTS

| | | | | |
|---|---|---|---|---|
| 5,482,314 | A * | 1/1996 | Corrado | G01S 15/523 |
| | | | | 280/735 |
| 8,199,027 | B1 * | 6/2012 | Rubin | G08C 23/04 |
| | | | | 340/521 |
| 2001/0028171 | A1 * | 10/2001 | Omata | B60L 50/16 |
| | | | | 290/400 |
| 2003/0098784 | A1 * | 5/2003 | Van Bosch | G08B 21/24 |
| | | | | 340/425.5 |
| 2015/0279195 | A1 * | 10/2015 | Qian | G08B 21/22 |
| | | | | 340/540 |
| 2015/0286882 | A1 * | 10/2015 | Nicol | G06K 9/00838 |
| | | | | 348/148 |
| 2016/0082923 | A1 * | 3/2016 | Gavriel | G08B 21/22 |
| | | | | 340/438 |
| 2017/0182939 | A1 * | 6/2017 | Phatak | G08B 21/22 |
| 2018/0053397 | A1 * | 2/2018 | Kaur | G08B 21/24 |
| 2018/0315292 | A1 * | 11/2018 | Pham | B60Q 9/00 |

* cited by examiner

*Primary Examiner* — Hongmin Fan (57) ABSTRACT

The present disclosure provides an alarm apparatus and a vehicle safety system for preventing leaving child in a vehicle. The alarm apparatus includes: a power supply circuit configure to supply power to the alarm apparatus; a central processing unit; a communication module configured to transmit alarm information to an external communication terminal; a vehicle condition monitoring device; at least an infrared monitor configured to monitor whether there is a human in the vehicle and transmit a human monitoring result to the central processing unit; and a temperature sensor configured to monitor a temperature inside the vehicle and transmit a temperature detection result to the central processing unit such that the central processing unit control the communication module to transmit the alarm information to the external communication terminal based on the temperature detection result. In this manner, leaving children in vehicles can be effectively prevented to avoid accidents.

12 Claims, 7 Drawing Sheets

ALARM APPARATUS AND VEHICLE SAFETY SYSTEM FOR PREVENTING LEAVING CHILD IN VEHICLE

REFERENCE TO RELATED APPLICATION PROGRAMS

This application claims priority to Chinese Patent Application No. CN 201921404154.1, filed Aug. 27, 2019, which is hereby incorporated by reference herein as if set forth in its entirety.

BACKGROUND

1. Technical Field

The present disclosure relates to automobile safety technology, and particularly to an alarm apparatus and a vehicle safety system for preventing leaving child in a vehicle.

2. Description of Related Art

Automobiles are one of the main transportation means for nowaday's people. Hence, automobile safety is one of the core performance indicator of an automobile that the user will pay attention to. However, at present, the automobile safety technology is merely focus on driving safety and collision safety.

In recent years, the cases that leaving child in the automobile which causes death accidents have caused widespread concerns. The inventor(s) of the present disclosure found during the researches that, the problem about how to improve the safety of the automobile in a non-starting state that will reduce accidents is eager to solve.

SUMMARY

One of the objectives of the embodiments of the present disclosure is to provide an alarm apparatus and a vehicle safety system for preventing leaving child in a vehicle. By applying the technical solutions of the embodiments, forgetting children in vehicles can be effectively prevented to avoid accidents.

In a first aspect, the present disclosure provides an alarm apparatus for preventing leaving child in a vehicle, which including:

a power supply circuit configure to supply power to the alarm apparatus;

a central processing unit;

a communication module electrically coupled to the central processing unit, where the communication module is configured to transmit alarm information to an external communication terminal in response to a control of the central processing unit;

a vehicle condition monitoring device electrically coupled to each of the central processing unit and a vehicle battery of the vehicle, where the vehicle condition monitoring device is configured to sample a power output of the vehicle battery to the vehicle to detect whether the vehicle is currently in a stall state and transmit a detection result to the central processing unit;

at least an infrared monitor electrically coupled to the central processing unit, where the infrared monitor is configured to monitor whether there is a human in the vehicle in response to a control of the central processing unit and transmit a human monitoring result to the central processing unit; and a temperature sensor electrically coupled to the central processing unit, where the temperature sensor is configured to monitor a temperature inside the vehicle in response to a control of the central processing unit and transmit a temperature detection result to the central processing unit such that the central processing unit control the communication module to transmit the alarm information to the external communication terminal based on the temperature detection result.

In one embodiment, the infrared monitor is a passive infrared monitor.

In one embodiment, the alarm apparatus includes a plurality of infrared monitors, and the plurality of infrared monitors are respectively electrically coupled to the central processing unit and located at different positions of the alarm apparatus.

In one embodiment, the alarm apparatus further includes: a tri-state buffer gate circuit electrically coupled between each of the plurality of infrared monitors and the central processing unit.

In one embodiment, the tri-state buffer gate circuit is an integrated circuit of the type 74HC224.

In one embodiment, the passive infrared monitor includes: a passive infrared receiver; and a pyroelectric sensor processor including an input end electrically coupled to the passive infrared receiver and an output end electrically coupled to the central processing unit.

In one embodiment, the alarm apparatus further includes: a Fresnel lens mounted in front of the passive infrared receiver.

In one embodiment, the alarm apparatus further includes: an expansion interface for an external infrared monitor, where the expansion interface is provided on a housing of the alarm apparatus.

In one embodiment, the communication module is a GSM module.

In one embodiment, the communication module includes: a control input end electrically coupled to an IO interface of the central processing unit; and a serial port electrically coupled to a serial port of the central processing unit In one embodiment, the power supply circuit includes: a power supply, where a power input end of the power supply is electrically coupled to an output end of a buck circuit, and an input end of the buck circuit is electrically coupled to the vehicle battery; a power output end of the power supply is electrically coupled to a rechargeable battery, and the power output end of the power supply is further electrically coupled to an input end of the buck circuit, and the output end of the buck circuit is electrically coupled to an power input end of the central processing unit;

the power output end of the power supply is further electrically coupled to a switch circuit and an input end of a boost circuit that are connected in series, and a control end of the switch circuit is electrically coupled to the central processing unit, and an output end of the boost circuit is electrically coupled to each of the infrared monitor and an power input end of the temperature sensor, and the rechargeable battery is electrically coupled to a power input end of the communication module.

In one embodiment, the vehicle condition monitoring device includes a first voltage sampling circuit, where an input end of the first voltage sampling circuit is electrically coupled to a power supply output end of the vehicle battery to the vehicle, and an output end of the first voltage sampling circuit is electrically coupled to the central processing unit.

In one embodiment, the vehicle condition monitoring device further includes a second voltage sampling circuit, where an input end of the second voltage sampling circuit is electrically coupled to a battery power monitoring interface of the vehicle battery, and an output end of the second voltage sampling circuit is electrically coupled to the central processing unit such that the central processing unit control the communication module to transmit power alarm information to the external communication terminal based on a current remaining power of the vehicle battery.

In a second aspect, the present disclosure further provides a vehicle safety system including any of the above-mentioned alarm apparatus for preventing leaving child in the vehicle.

It can be seen from the above that, by applying the technical solutions of the present disclosure, in the case that any infrared monitor detects that there is currently a person inside the vehicle, the central processing unit transmits the alarm information to the external communication terminal of the user according to a vehicle starting condition and a temperature detection result received from the vehicle condition monitoring circuit and the temperature sensor, so as to notify that there is a person currently trapped in the vehicle, and then the vehicle enters an alarm state so as to notify the relevant personnel to rescue in time and avoid accidents.

For example, in the case that any infrared monitor detects that there is currently a person inside the vehicle, and it determines based on a signal input by the vehicle condition monitoring circuit that the vehicle is currently in the stall state, the central processing unit wakes up the communication module afer a predetermined duration afer the vehicle is stalled to control the communication module to transmit the alarm information to the predetermined external communication terminal so as to inform the user that there is a person currently trapped in the vehicle while the trapped duration has exceeded an alarm duration so as to notify the relevant personnel to deal with in time.

For example, in the case that any infrared monitor detects that there is currently a person inside the vehicle, as long as the temperature sensor detects that the current temperature exceeds a predetermined alarm temperature, the central processing unit will wake up the communication module regardless of whether the vehicle is currently in the stall state to control the communication module to transmit the alarm information to the predetermined external communication terminal so as to inform the user that there is a person currently trapped in the vehicle while the temperature inside the vehicle exceeds the alarm temperature, thereby notifying the relevant personnel to deal with in time.

The apparatus can be widely used in vehicles especially for family cars or school buses, so as to prevent children from being forgotten in the vehicle and to be dangerous. Compared with the prior art that sets the horn to be usable in the stall state which allows the trapped person to notify the relevant personnel by using the horn, the technical solutions provided by the present disclosure is more intelligent and more reliable.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The present disclosure will be described in detail with reference to the drawings and embodiments. Herein, the drawings and the description of the exemplary embodiments of the present disclosure are intended to explain the present disclosure, but are not intended to limit the present disclosure.

Figure 1:
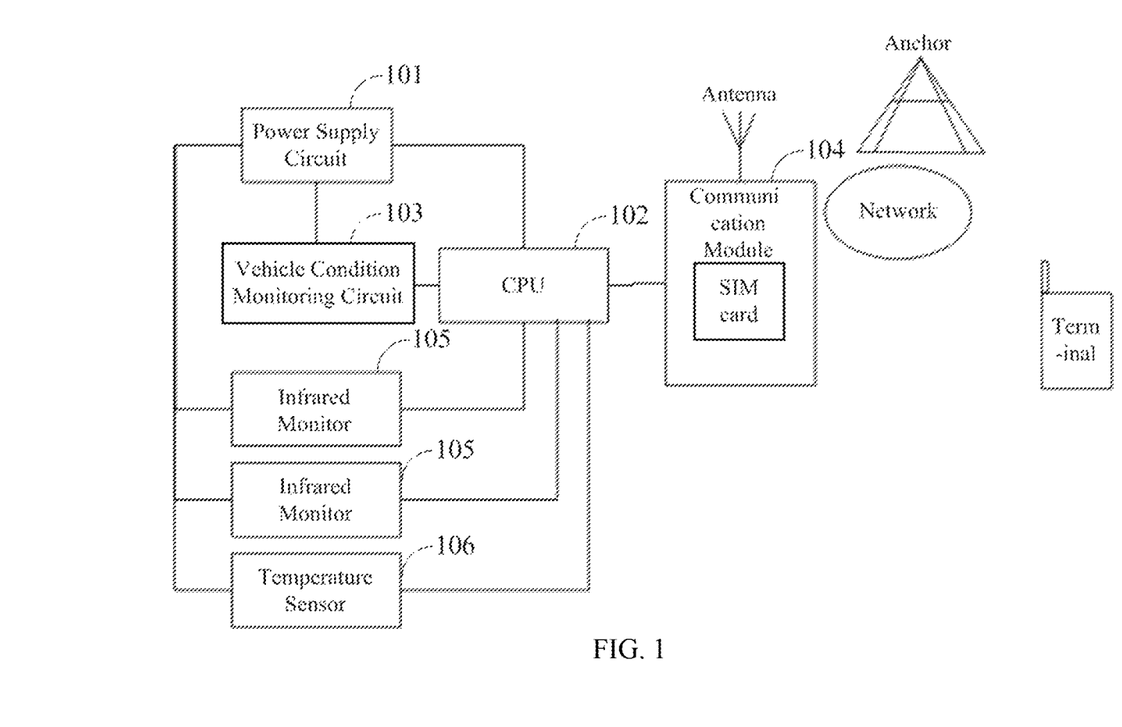
FIG. 1 is a schematic block diagram of an application scenario of an alarm apparatus for preventing leaving child in a vehicle according to an embodiment of present disclosure.

As shown in FIG. 1, in this embodiment, an alarm apparatus for preventing leaving child in a vehicle is provided. The alarm apparatus can be applied to the vehicle such as an automobile. The alarm apparatus at least includes: a power supply circuit 101, a central processing unit (CPU) 102, a vehicle condition monitoring circuit 103, and a communication module 104, a temperature sensor 106, and at least an infrared monitor 105.

In which, the power supply circuit 101 is electrically coupled to each of the CPU 102, the vehicle condition monitoring circuit 103, the infrared monitor 105, the temperature sensor 106, and the communication module 104 so as to provide power for the operation of each above-mentioned component of the alarm apparatus.

In this embodiment, the power supply circuit 101 supplies power to each above-mentioned component of the alarm apparatus by using the electric power of a vehicle battery of the vehicle. The vehicle condition monitoring circuit 103 is electrically coupled to the vehicle battery of the vehicle for detecting an output end of the vehicle battery for powering the automobile so as to monitor whether the automobile is currently in a stall state, and transmits a monitoring result to the CPU 102 for the central processing unit, 102 to perform correspondingly control(s) for the interior condition (e.g., there is a person in the vehicle and/or the current temperature exceeds a predetermined alarm temperature) of the vehicle after the vehicle is stalled. In one embodiment, the CPU 102 is electrically coupled to each of the vehicle condition monitoring circuit 103, the infrared monitor 105, and the communication module 104 to receive the monitoring result of each monitoring device (e.g., the vehicle condition monitoring circuit 103 and the infrared monitor 105), which controls each monitoring device to operate and awakes the communication module 104 based on each monitoring result so as to control the communication module 104 to transmit alarm information to an external communication terminal (e.g., a mobile device such as a mobile phone) of the user.

The working principle of applying the alarm apparatus to the vehicle is as follows.

Figure 2:
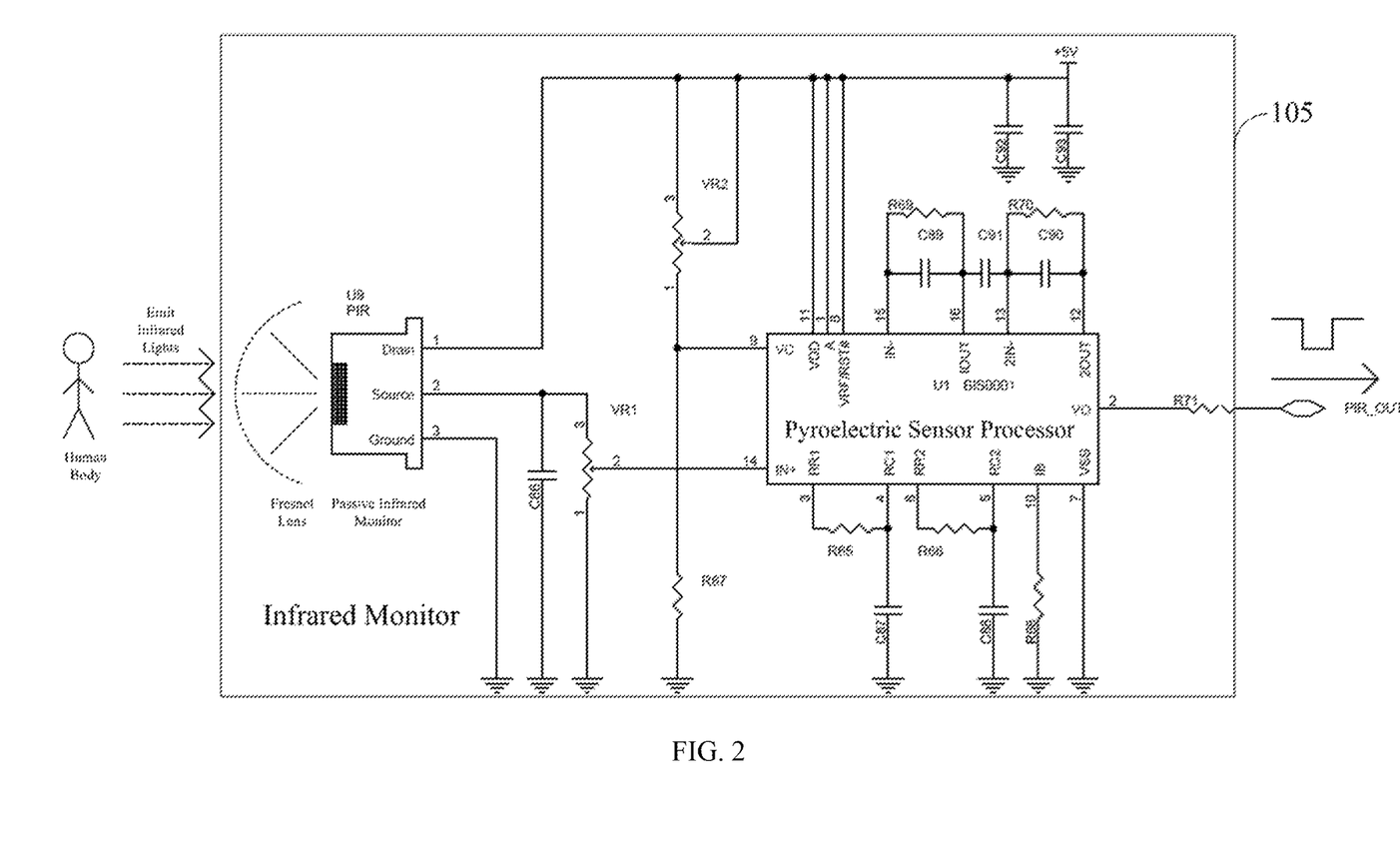
FIG. 2 is a schematic block diagram of a vehicle condition monitoring device according to an embodiment of present disclosure.
Figure 4:
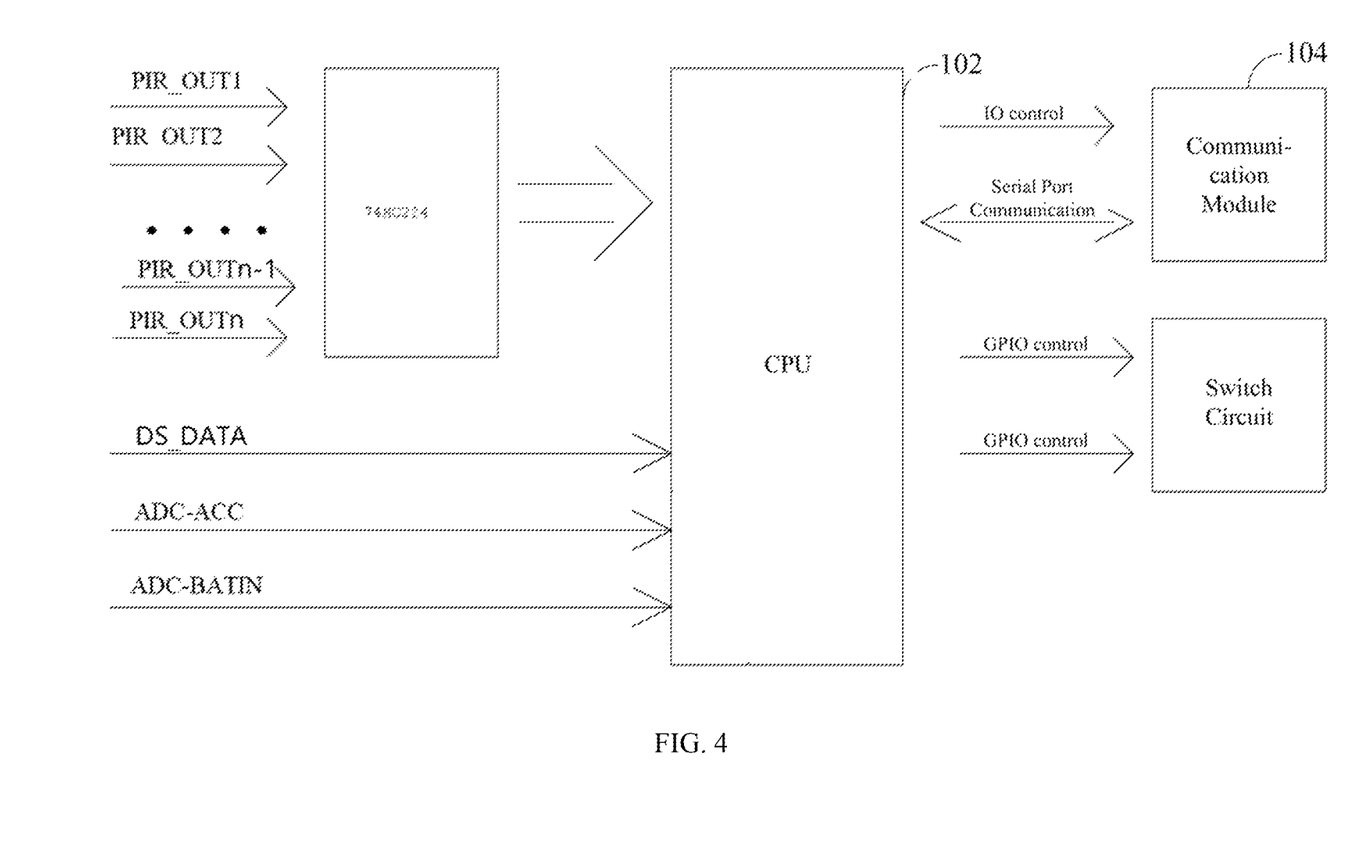
FIG. 4 is a schematic block diagram of a central processing unit according to an embodiment of present disclosure.

As shown in FIG. 2 and FIG. 4, the vehicle condition monitoring circuit 103 is electrically coupled to a power supply output end ACC of the vehicle battery with respect to the vehicle, which samples the voltage of the power supply output end ACC to realize an analog-to-digital (ADC) conversion (the sampled output end is labeled as ADC-ACC). The level signal is obtained from the sampled output end ADC-ACC to input to the CPU 102, and the CPU 102 determines whether the vehicle is currently in the stall state according to the level signal. In this embodiment, in the case that there is no current output from the power supply output end ACC of the vehicle battery that outputs currents to the vehicle, the sampled output end ADC-ACC inputs a high level to the CPU 102, and the CPU 102 determines that the vehicle is currently in the stall state.

As shown in FIG. 2, in this embodiment, one infrared monitor 105 is provided. In other embodiments, two or more infrared monitor 105 can also be provided.

Figure 3:
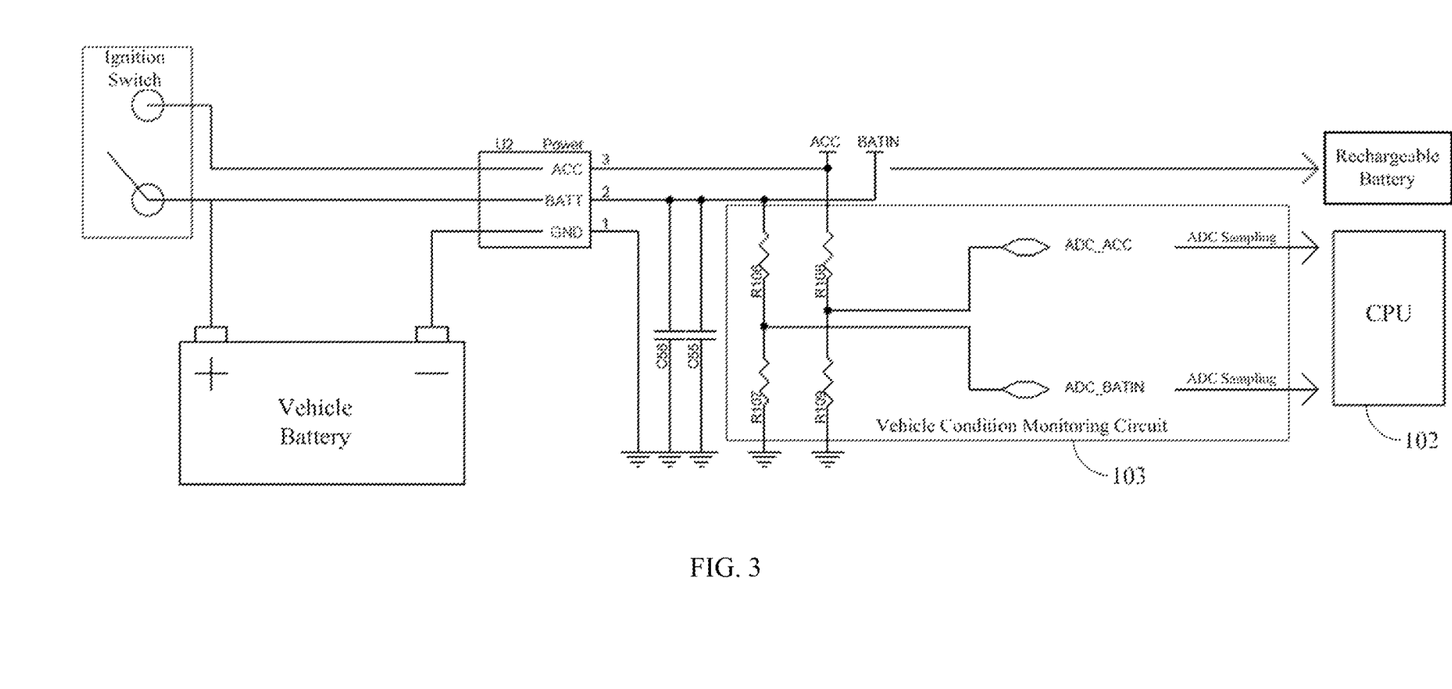
FIG. 3 is a schematic block diagram of an infrared monitor according to an embodiment of present disclosure.

As shown in FIG. 3, the infrared monitor 105 is electrically coupled to the CPU 102, which can be but is not limited to be coupled to a general purpose I/O interface of the CPU 102. The infrared monitor 105 is preferably a passive infrared monitor. Normally, a human body will emit infrared lights, and the wavelength of the infrared lights emitted by the human body will be within a certain wavelength band. A passive infrared receiver of the passive infrared monitor 105 receives an infrared light signal, converts the light signal into an electrical signal to input to a pyroelectric sensor processor (which can be but is not limited to an integrated circuit chip of the type BIS0001). The pyroelectric sensor processor analyzes the input electrical signal, and transmits a pulse signal PIR-OUT to the CPU 102 when it has analyzed that there is the electrical signal of the wavelength band of the infrared light emitted by the human body, so as to notify the CPU 102 that there is a person currently in the vehicle.

As shown in FIG. 3, in one embodiment, a Fresnel lens can be mounted at a front end of the passive infrared receiver of the passive infrared monitor 105, which enhances the incoming infrared light signal to obtain the enhanced infrared light signal to input to the passive infrared receiver, thereby improving the precision of the infrared detection.

Referring to FIG. 4, the working principle of the CPU 102 is as follows. If any infrared monitor 105 detects that there is a person currently in the vehicle, the CPU 102 transmits the alarm information to the external communication terminal of the user according to a vehicle starting condition and a temperature detection result received from the vehicle condition monitoring circuit 103 and the temperature sensor 106, so as to notify that there is a person currently trapped in the vehicle, and then the vehicle enters an alarm state so as to notify the relevant personnel to rescue in time and avoid accidents.

In this embodiment, an alarm condition (e.g., an alarm temperature and a vehicle stall duration) of the alarm apparatus for preventing leaving child in the vehicle and the number (which can have one or more) of the communication terminal that receives the alarm information can be edited and/or modified by the user through a management software for the alarm apparatus that is installed in the communication terminal in advance, and the edited and/or modified parameters (e.g., the alarm condition and the number of the communication terminal) are transmitted to the CPU 102 of the alarm apparatus via a communication network. The CPU 102 stores and updates locally according to the editing and/or modification of the user so as to monitor the status of the person on the vehicle according to the latest settings. The CPU 102 can implement the monitoring in accordance with a predetermined control process.

For example, if any infrared monitors 105 detects that there is currently a person in the vehicle, and determined that the vehicle is currently in the stall state according to the signal input through the end ADC-ACC of the vehicle condition monitoring circuit 103, after the vehicle is stalled for a predetermined duration (e.g., 10 minutes), the CPU 102 wakes up the communication module 104 to transmit the alarm information to the predetermined external communication terminal so as to inform the user that there is a person currently trapped in the vehicle while the trapped duration has exceeded an alarm duration so as to notify the relevant personnel to deal with in time.

For example, if any infrared monitor 105 monitors that there is currently a person in the vehicle, as long as the temperature sensor 106 detects that the current temperature exceeds a predetermined alarm temperature (which can be set in advance or set by the user, and can be but is not limited to be set to 50 degrees Celsius), the CPU 102 will wake up the communication module 104 regardless of whether the vehicle is currently in the stall state to control the communication module 104 to transmit the alarm information to the predetermined external communication terminal so as to inform the user that there is a person currently trapped in the vehicle while the temperature inside the vehicle exceeds the alarm temperature, thereby notifying the relevant personnel to deal with in time.

The apparatus can be widely used in vehicles especially for family cars or school buses, so as to prevent children from being forgotten in the vehicle and to be dangerous. Compared with the prior art that sets the horn to be usable in the stall state which allows the trapped person to notify the relevant personnel by using the horn, the technical solutions provided by the present disclosure is more intelligent and more reliable.

As shown in FIG. 2, in this embodiment, a plurality of infrared monitors 105 can be provided, which are respectively located at different positions of a housing of the alarm apparatus, so as to perform infrared monitoring at different positions inside the vehicle, thereby improving the scope of monitoring and improving the reliability of the status monitoring of the person on the vehicle.

In this embodiment, in addition to providing a plurality of infrared monitors 105 on the alarm apparatus, it can further provide at least one expansion interface for the external infrared monitor 105 on the housing of the alarm apparatus, so as to externally connect more external infrared monitors 105 according to the condition of the vehicle, thereby improving the scope of infrared monitoring and improving the convenience of the application of the alarm apparatus.

Referring to FIG. 4, in one embodiment, a tri-state buffer gate circuit (e.g., an integrated circuit of the type 74HC224) is electrically coupled between each infrared monitor 105 and the CPU 102. The output signals of a plurality of the infrared monitors 105 are input to the tri-state buffer gate circuit to perform a logical processing which determines that there is currently a person in the vehicle as long as any infrared monitor 105 detects that there is currently a person in the vehicle, and then the processed signals are outputted to the CPU 102 so that the CPU 102 performs a corresponding control on the component(s) of the alarm apparatus according to the monitoring result.

As shown in FIG. 2 and FIG. 4, in one embodiment, the vehicle condition monitoring circuit 103 is further electrically coupled to a battery power monitoring interface BAT of the vehicle battery so as to sample the voltage signal on the battery power monitoring interface BATT to perform ADC conversion. Remaining battery power information of the vehicle battery is obtained through a remaining battery power monitoring interface ADC-BATIN, and the remaining battery power information of the vehicle battery is transmitted to the CPU 102. When the remaining battery power is lower than a predetermined value, the CPU 102 wakes up the communication module 104 to control the communication module 104 to transmit battery power alarming information to the predetermined external communication terminal so as to inform the user of the current remaining battery power for the user to deal with.

Figure 5:
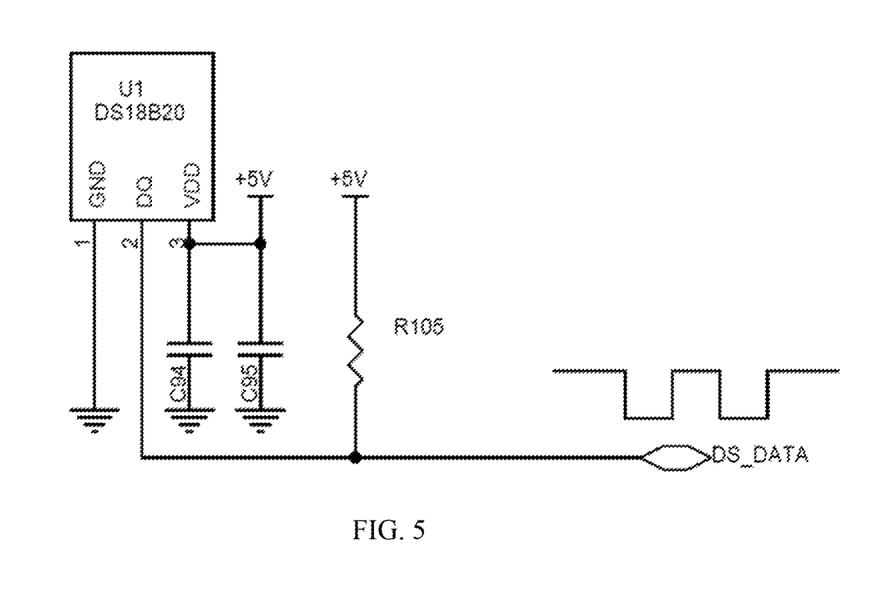
FIG. 5 is a schematic block diagram of a central processing unit according to an embodiment of present disclosure.

As shown in FIG. 2, in one embodiment, the alarm apparatus is further provided with a temperature sensor 106. Referring to FIG. 4 and FIG. 5, the temperature sensor 106 can be but is not limited to a temperature detecting element (e.g., an integrated circuit of the type DS18B20). The temperature detecting element converts a thermal signal into an electrical signal DS_DATA to input to the CPU 102. The CPU 102 obtains temperature information of the interior of the vehicle according to the electrical signal DS_DATA. If any infrared monitor 105 monitors that there is a person currently in the vehicle, while the temperature inside the vehicle is greater than a predetermined alarming temperature, the CPU 102 wakes up the communication module 104 to the control communication module 104 to transmit temperature alarm information to the predetermined communication terminal so as to inform the user that there is a person currently trapped in the vehicle while there is a dangerous environment with high temperature inside the vehicle, thereby notifying the relevant personnel to rescue in time.

Figure 6:
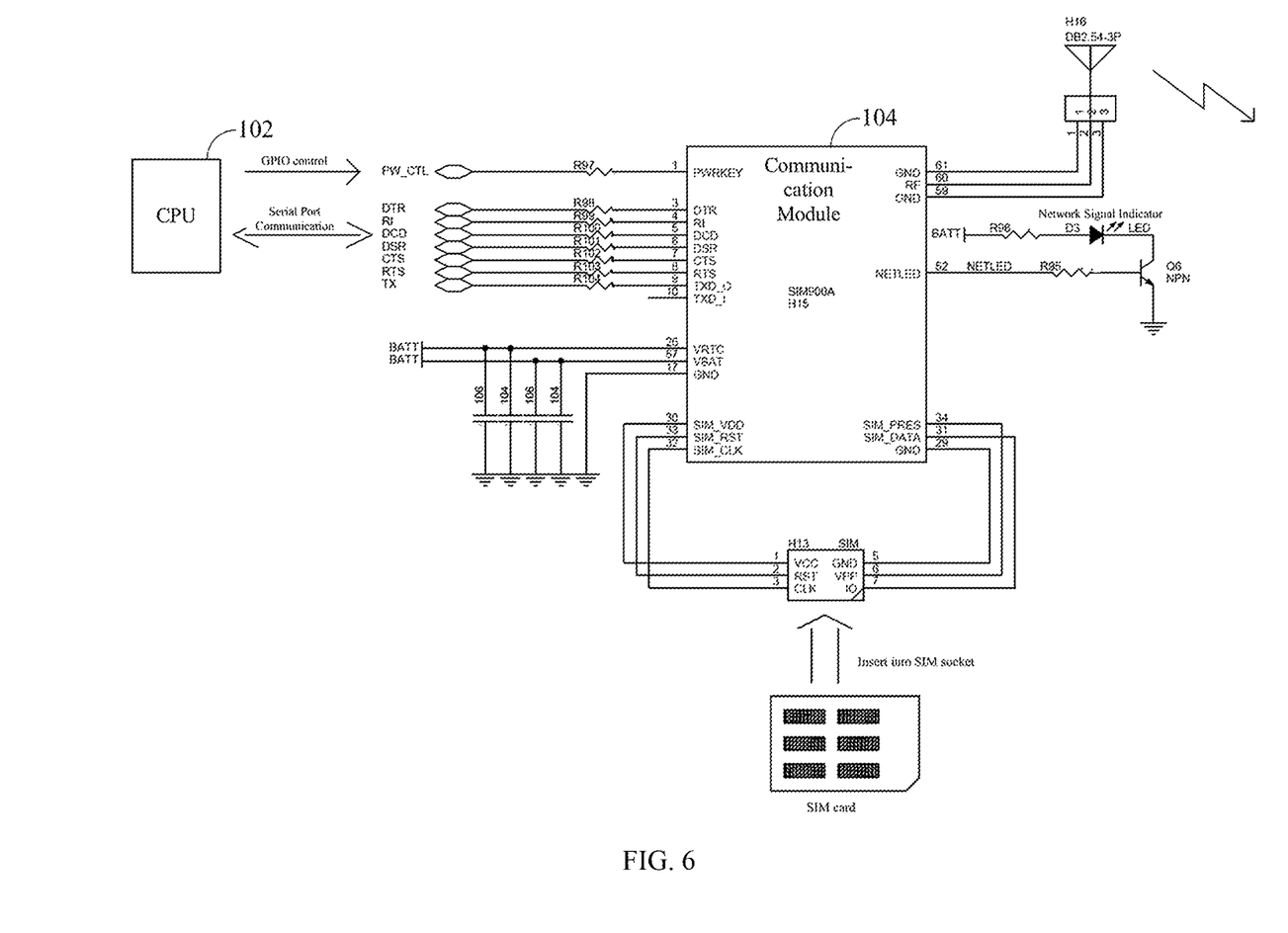
FIG. 6 is a schematic block diagram of a GSM module and a central processing unit according to an embodiment of present disclosure.

As shown in FIG. 6, in one embodiment, the communication module 104 can be but is not limited to a GSM module (e.g., an integrated circuit of the type SIM900A). In the actual application, a SM card is installed in the GSM module. As an example, an IO interface of the CPU 102 is electrically coupled to a control end of the GSM module, and the CPU 102 transmits a control signal to the GSM module to wake up the GSM module through the IO interface. A serial port of the CPU 102 is electrically coupled to a serial port of the communication module 104. After the GSM module is woken up, the CPU 102 communicates with the GSM module to transmit data signals through the serial ports, and transmits the alarming information to be transmitted to the GSM module to control the GSM module to transmit the alarming information to the external communication terminal, so as to inform the user that there is a person trapped in the vehicle, so that the person in the vehicle can get rescue in time to avoid accidents.

In this embodiment, through an application program in the operating system of the communication terminal, the user can edit information on the communication terminal to transmit to the SIM card on the GSM module. After receiving the information, the GSM module forwards the information to the CPU 102 through the serial port. The CPU 102 stores the information and the number of the communication terminal, so as to transmit the alarming information to the communication terminal when an alert is required.

Figure 7:
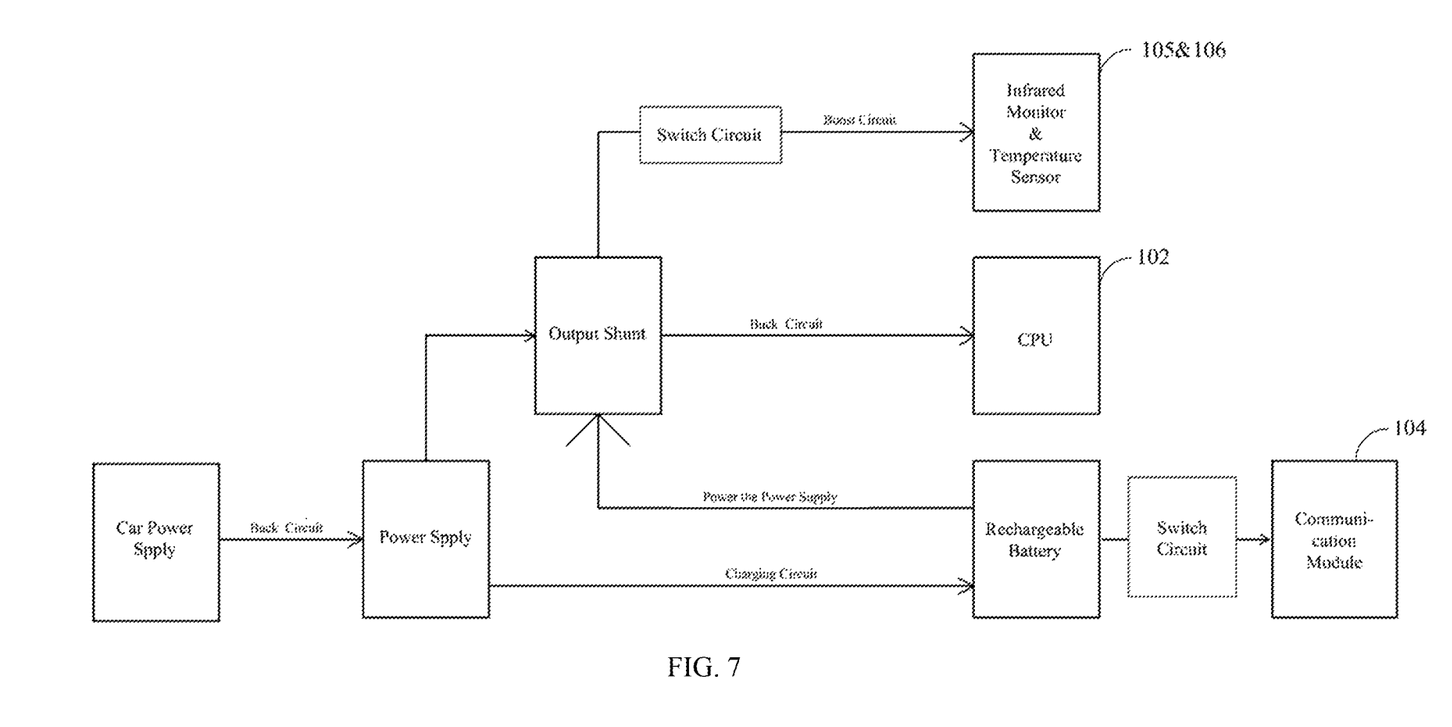
FIG. 7 is a schematic block diagram of a power supply circuit according to an embodiment of present disclosure.

As shown in FIG. 7, in one embodiment, the power supply circuit 101 includes: a power supply. An input end of the power supply is electrically coupled to an output end of a buck circuit, and an input end of the buck circuit is electrically coupled to the vehicle battery to introduce electric power from the vehicle battery to the power supply. The power supply provides multiple outputs according to the power supply requirements of each component, where a power output end of the power supply is electrically coupled to a rechargeable battery to charge the rechargeable battery when the vehicle battery can provide power, thereby realizing energy storage. The rechargeable battery is electrically coupled to the communication module 104 to supply power thereto, and the rechargeable battery can also substitute the vehicle battery to supply power to the power supply when the battery power of the vehicle battery is too low, thereby ensuring the normal operation of the alarm apparatus. The power output end of the power supply is further electrically coupled to the input end of the buck circuit, where the buck circuit outputs the voltage to the power input end of the CPU 102 after performing DC-DC voltage reduction, thereby powering the CPU 102.

A power output end of the power supply is further electrically coupled to a switch circuit and a boost circuit that are connected sequentially in series. When the switch circuit is turned on, the boost circuit boosts the voltage signal input by the power supply to a working voltage required by the infrared monitor 105 and the temperature sensor 106 to output to the infrared monitor 105 and the temperature sensor 106 so as to drive them to operate.

In this embodiment, a control end of the switch circuit is electrically coupled to the central processing unit 102. The CPU 102 controls the operation of the infrared monitor 105 and the temperature sensor 106 by switching the switch circuit on and off.

In this embodiment, the alarm apparatus for preventing leaving child in the vehicle can be applied to various vehicles especially for family cars or school buses The above-described embodiments do not constitute a limitation on the scope of the present disclosure. Any modifications, equivalent substitutions and improvements made within the spirit and principles of the above-described embodiments are intended to be included within the scope of the technical solutions of present disclosure.

What is claimed is:

1. An alarm apparatus for preventing leaving child in a vehicle, comprising:
   a power supply circuit configure to supply power to the alarm apparatus;
   a central processing unit;
   a communication module electrically coupled to the central processing unit, wherein the communication module is configured to transmit alarm information to an external communication terminal in response to a control of the central processing unit;
   a vehicle condition monitoring device electrically coupled to each of the central processing unit and a vehicle battery of the vehicle, wherein the vehicle condition monitoring device is configured to sample a power output of the vehicle battery to the vehicle to detect whether the vehicle is currently in a stall state and transmit a detection result to the central processing unit;
   at least an infrared monitor electrically coupled to the central processing unit, wherein the infrared monitor is configured to monitor whether there is a human in the vehicle in response to a control of the central processing unit and transmit a human monitoring result to the central processing unit; and
   a temperature sensor electrically coupled to the central processing unit, wherein the temperature sensor is configured to monitor a temperature inside the vehicle in response to a control of the central processing unit and transmit a temperature detection result to the central processing unit such that the central processing unit control the communication module to transmit the alarm information to the external communication terminal based on the temperature detection result;

wherein, the central processing unit is configured to control the communication module to transmit the alarm information to the external communication terminal after the vehicle is stalled for a predetermined duration according to the human monitoring result received from the infrared monitor and the detection result received from the vehicle condition monitoring device in response to the infrared monitor having detected a human in the vehicle and the vehicle condition monitoring device having detected the vehicle being in the stall state;

wherein the power supply circuit includes:

a power supply;

wherein, a power input end of the power supply is electrically coupled to an output end of a buck circuit, and an input end of the buck circuit is electrically coupled to the vehicle battery; a power output end of the power supply is electrically coupled to a rechargeable battery, and the power output end of the power supply is further electrically coupled to an input end of the buck circuit, and the output end of the buck circuit is electrically coupled to an power input end of the central processing unit;

the power output end of the power supply is further electrically coupled to a switch circuit and an input end of a boost circuit that are connected in series, and a control end of the switch circuit is electrically coupled to the central processing unit, and an output end of the boost circuit is electrically coupled to each of the infrared monitor and an power input end of the temperature sensor, and the rechargeable battery is electrically coupled to a power input end of the communication module.

2. The alarm apparatus of claim 1, wherein the infrared monitor is a passive infrared monitor.

3. The alarm apparatus of claim 1, wherein the alarm apparatus comprises a plurality of infrared monitors, and the plurality of infrared monitors are respectively electrically coupled to the central processing unit and located at different positions of the alarm apparatus.

4. The alarm apparatus of claim 3, further comprising:
a tri-state buffer gate circuit electrically coupled between each of the plurality of infrared monitors and the central processing unit.

5. The alarm apparatus of claim 4, wherein the tri-state buffer gate circuit is an integrated circuit of the type 74HC224.

6. The alarm apparatus of claim 2, wherein the passive infrared monitor comprises:
a passive infrared receiver; and
a pyroelectric sensor processor comprising an input end electrically coupled to the passive infrared receiver and an output end electrically coupled to the central processing unit.

7. The alarm apparatus of claim 6, further comprising:
a Fresnel lens mounted in front of the passive infrared receiver.

8. The alarm apparatus of claim 1, further comprising:
an expansion interface for an external infrared monitor, wherein the expansion interface is provided on a housing of the alarm apparatus.

9. The alarm apparatus of claim 1, wherein the communication module is a GSM module.

10. The alarm apparatus of claim 1, wherein the communication module comprises:
a control input end electrically coupled to an IO interface of the central processing unit; and
a serial port electrically coupled to a serial port of the central processing unit.

11. The alarm apparatus of claim 1, wherein the vehicle condition monitoring device includes:
a first voltage sampling circuit;
wherein, an input end of the first voltage sampling circuit is electrically coupled to a power supply output end of the vehicle battery to the vehicle, and an output end of the first voltage sampling circuit is electrically coupled to the central processing unit.

12. The alarm apparatus of claim 1, wherein the vehicle condition monitoring device further includes:
a second voltage sampling circuit, wherein an input end of the second voltage sampling circuit is electrically coupled to a battery power monitoring interface of the vehicle battery, and an output end of the second voltage sampling circuit is electrically coupled to the central processing unit such that the central processing unit control the communication module to transmit power alarm information to the external communication terminal based on a current remaining power of the vehicle battery.

* * * * *